United States Patent [19]

Williams

[11] Patent Number: 5,429,196

[45] Date of Patent: Jul. 4, 1995

[54] THREE POINT EASY HITCH

[76] Inventor: William C. Williams, 10213 Jordan Rd., Raleigh, N.C. 27603

[21] Appl. No.: 145,610

[22] Filed: Nov. 4, 1993

[51] Int. Cl.$^6$ ............................................. A01B 59/04
[52] U.S. Cl. .................................. 172/439; 172/447
[58] Field of Search ............... 172/439, 443, 446, 447, 172/272; 280/455.1, 474, 491.2, 491.5, 493; 403/79, 157, 116, 150, 154

[56]  References Cited

U.S. PATENT DOCUMENTS

| | | |
|---|---|---|
| 2,743,117 | 4/1956 | Hutchings . |
| 2,869,654 | 1/1959 | Hershman . |
| 3,029,880 | 4/1962 | Heberlein . |
| 3,078,930 | 2/1963 | Foote ............................ 172/443 X |
| 3,220,751 | 11/1965 | Tweedale . |
| 3,434,735 | 3/1969 | Bernard ........................ 280/455.1 |
| 4,331,347 | 5/1982 | Madden . |
| 4,418,936 | 12/1983 | Adams et al. ................. 280/493 X |
| 5,306,037 | 4/1994 | Robertson ..................... 280/493 X |
| 5,346,018 | 9/1994 | Koster .......................... 172/272 |

FOREIGN PATENT DOCUMENTS 3066952 12/1962 United Kingdom .
1021219 4/1966 United Kingdom .

*Primary Examiner*—Randolph A. Reese
*Assistant Examiner*—Howard N. Shipley

[57] ABSTRACT

A hitch for connecting and disconnecting implements to a tractor. A hitch with a tapered opening that can rotate in any direction is connected to a tractor's lift arms and stabilizer bars. When the hitch has made contact with the implement being used a retaining pin is inserted through the hitch to secure the implement while in use. To disconnect the implement, remove retaining pin from the hitch and store in the tab on the side of the hitch and drive away from the implement.

2 Claims, 7 Drawing Sheets

THREE POINT EASY HITCH

BACKGROUND OF THE INVENTION

1. Field of the Invention

The subject invention generally pertains to hitches, and more specifically to three point tractor hitches.

2. Description of Related Art

Many current hitches have quick connect and disconnect features to hook up different types of implements.

The disvantages of these hitches are,they are very expensive, difficult to mount to a tractor, and the implements used with these hitches must be modifed to use the hitches.

Other hitches incorporate hydraulics to operate, this is expensive and complicated to connect to a tractor.

SUMMARY OF INVENTION

To avoid the limitations and problems with the present three point hitches, it is an object of the subject invention to connect and disconnect implements to a three point hitch tractor with a miminum amount of effort.

Another object of the said invention is to provide a hitch that is inexpensive.

Another object of the said invention is to provide a hitch that will still work after being exposed to the elements; dirt and rust will not prevent said hitch from performing the job it was designed to do.

Another object of the said invention is connecting and disconnecting the hitch from a tractor with a miminum amount of effort using no tools.

Another object of the said invention is that no modifications will have to be made to three point implements to use this hitch.

These and other objects of the invention are provided by a novel hitch that includes a coupler and several connecting pins. The coupler contacts the implement; a retaining pin is inserted into the coupler to secure the implement.

DESCRIPTION OF THE PREFERRED EMBODIMENT

Figure 1:
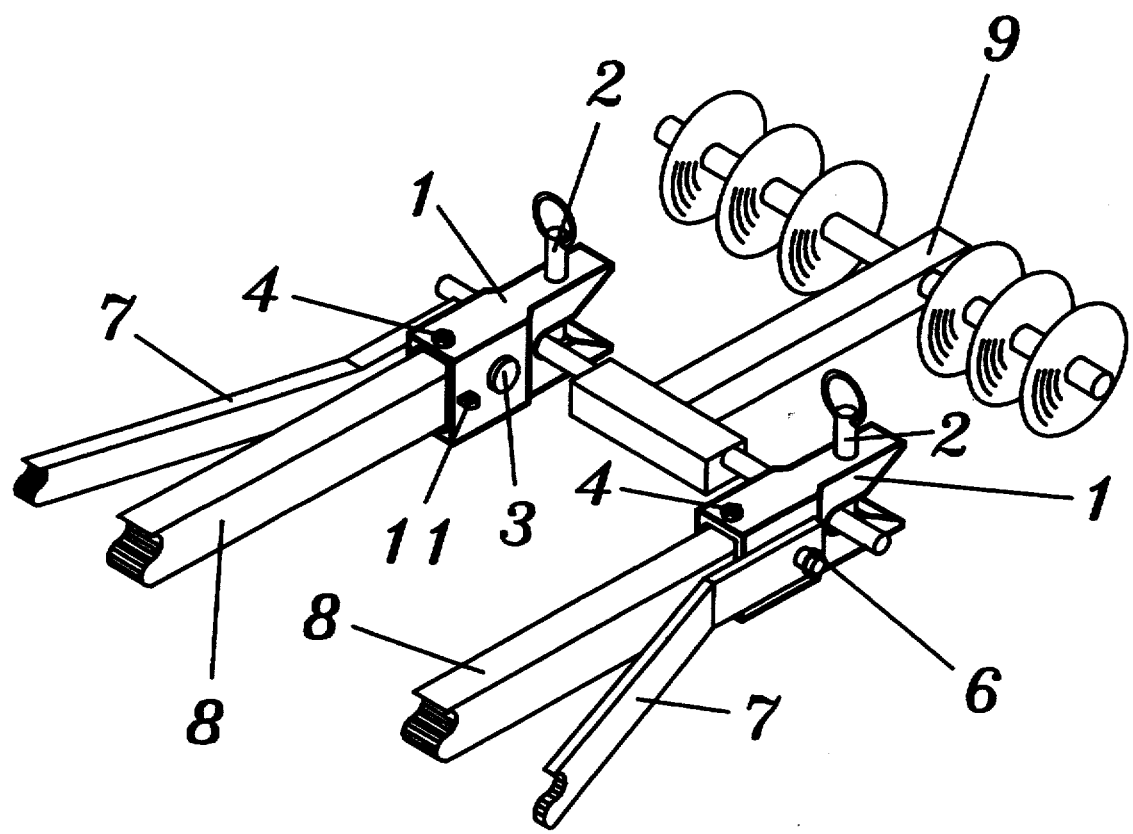
FIG. 1 illustrates the hitch connected to a tractors lift arms and connected to an implement according to the subject invention.
Figure 2:
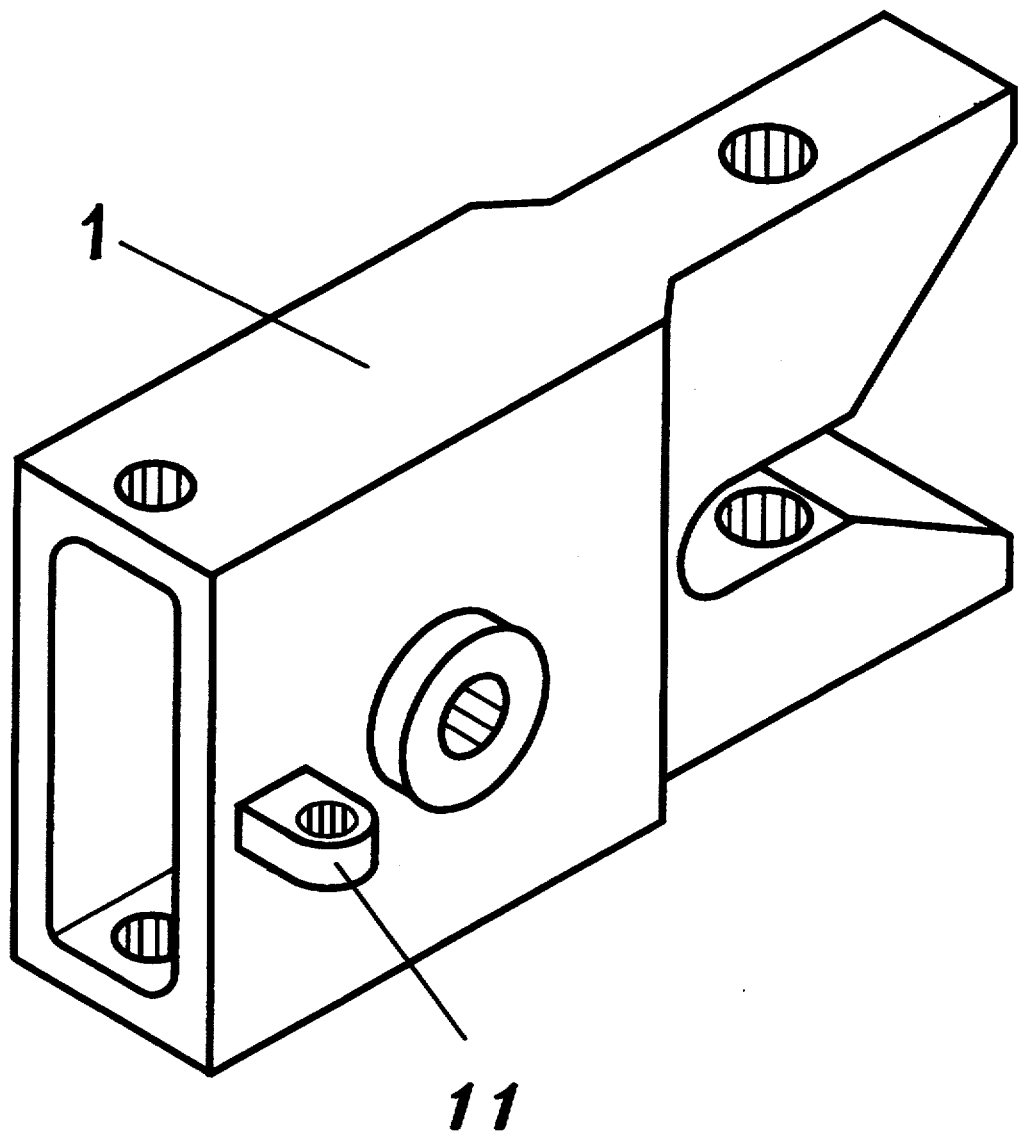
FIG. 2 illustrates a coupler according to subject invention.
Figure 3:
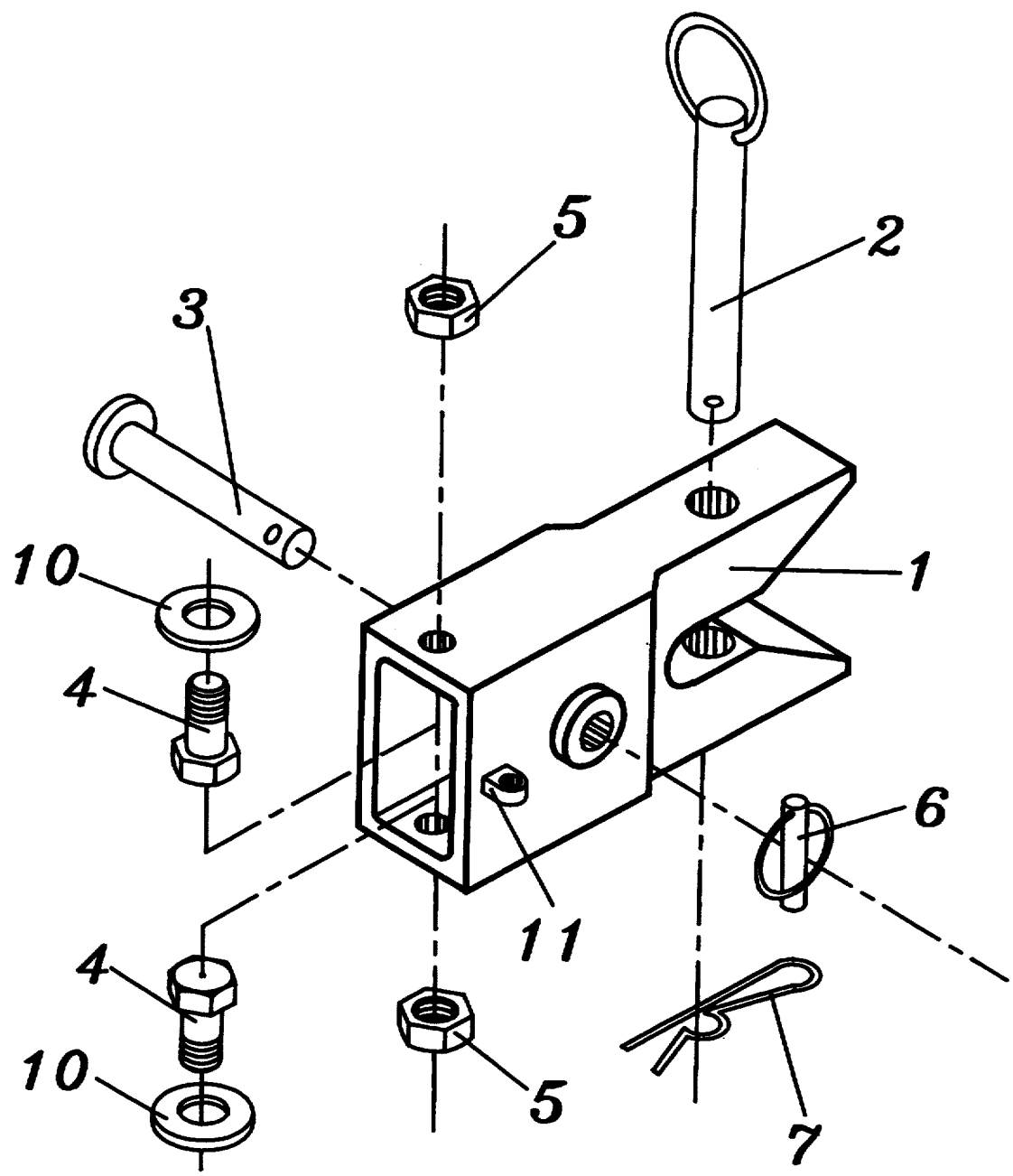
FIG. 3 illustrates said invention in an exploded view.

Referring to FIG. 1, illustrates a coupler 1, connected to a tractors lift arms 8, and a implement 9. A connecting pin 3, inserted through coupler 1, lift arms 8, and stabilizer bars 7, connects the hitches to the tractor. A lynch pin 6, inserted through connecting pin 3, prevents said pin from becoming dislogded while in use. A retaining pin 2, inserted through coupler 1, secures implement 9.

Figure 4:
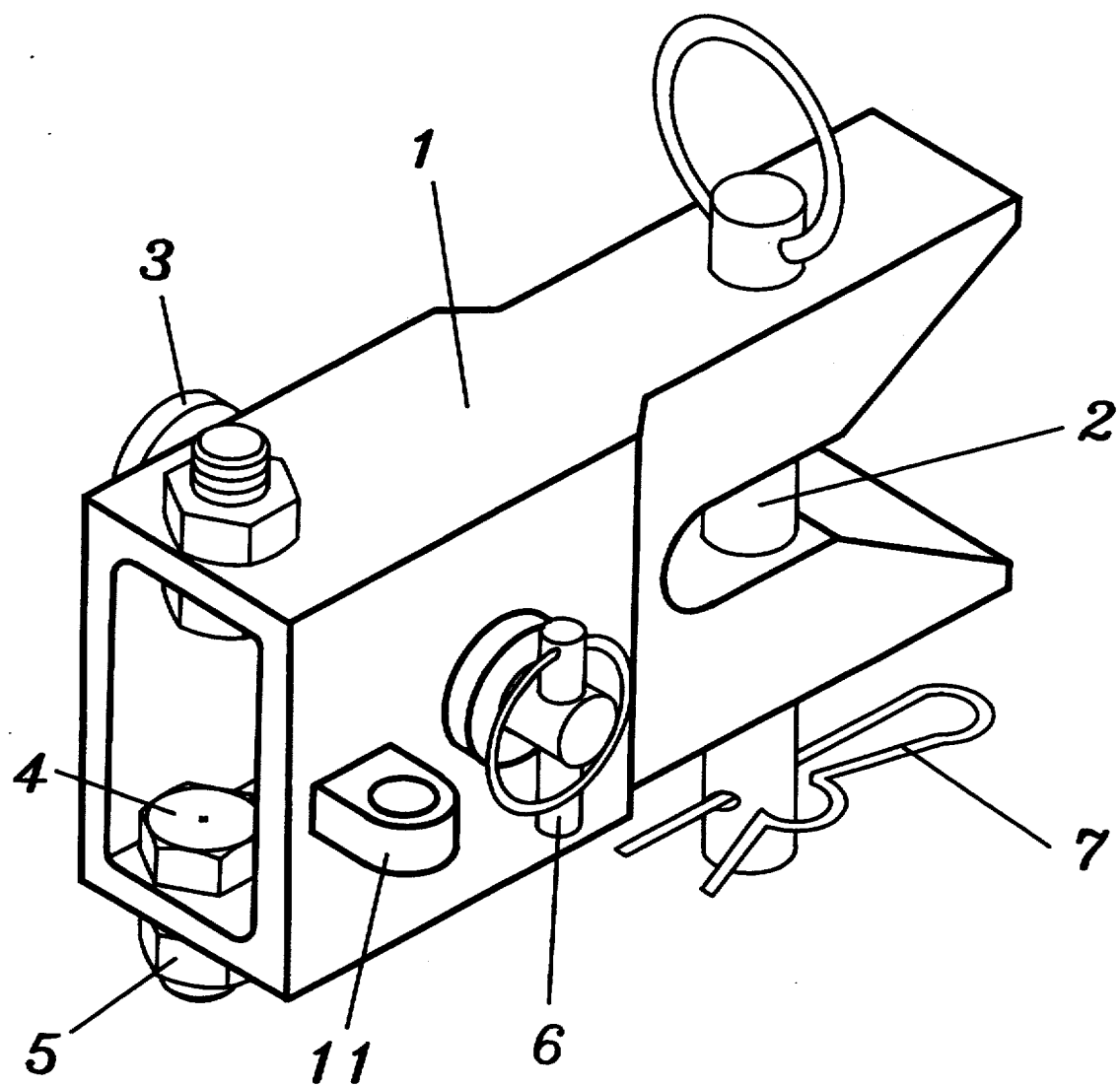
FIG. 4 illustrates said hitch with all components assembled.

Referring to FIG. 4, a hairpin 7, inserted through retaining pin 2, prevents said pin from backing out of coupler 1, while a implement is connected and in use.

Figure 5:
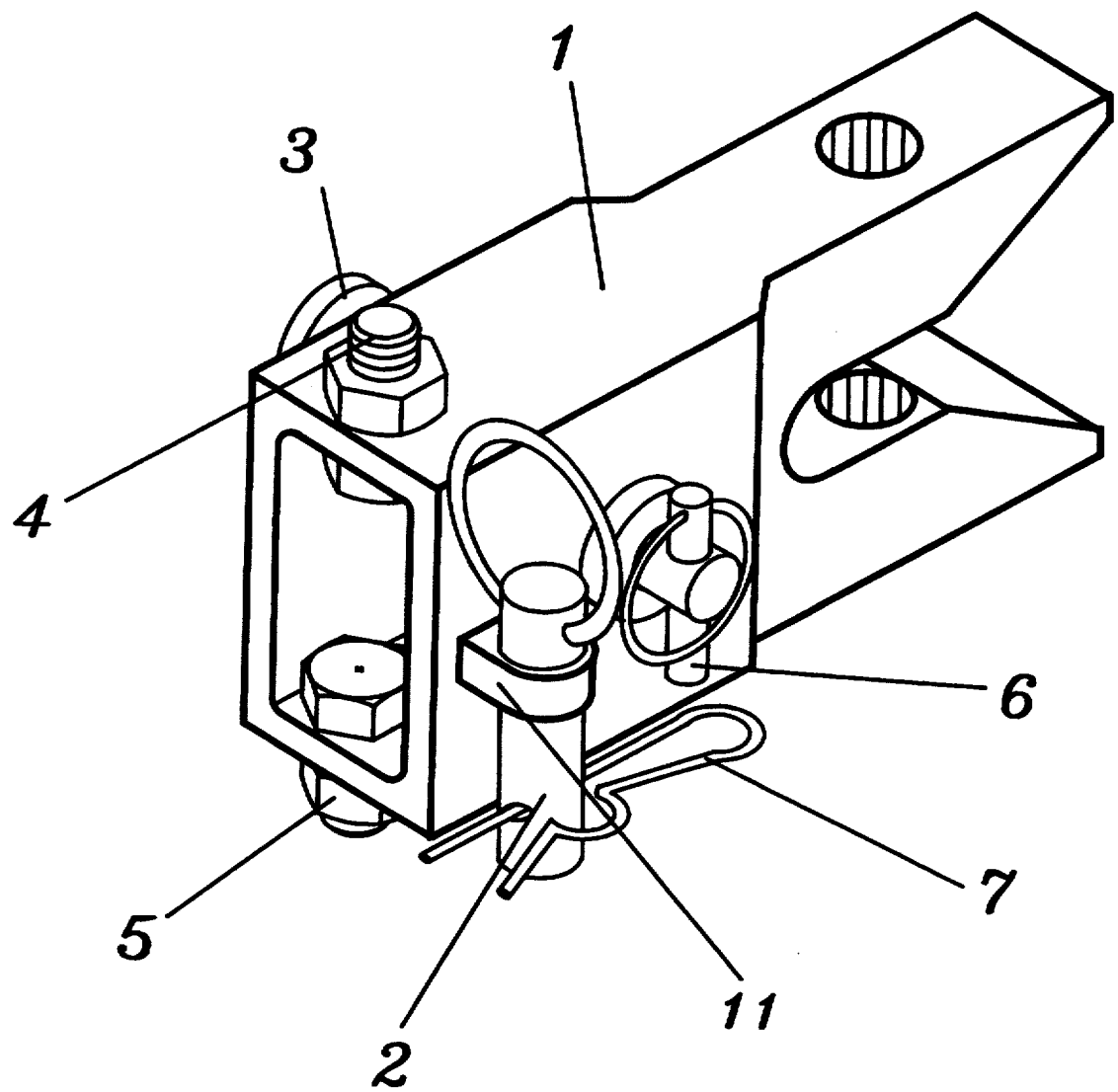
FIG. 5 illustrates said hitch with retaining pin stored in retaining tab.
Figure 6:
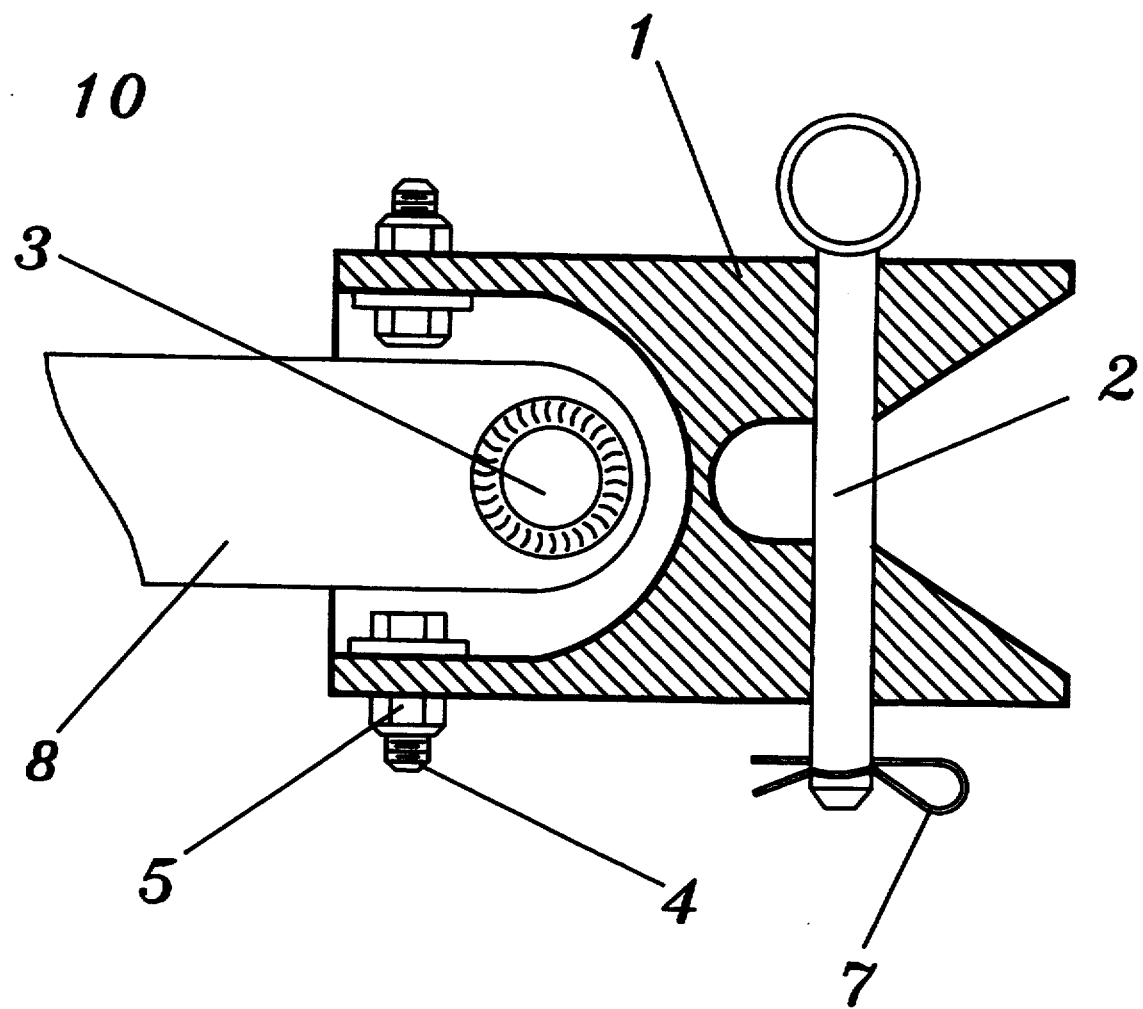
FIG. 6 is a cross section view with said hitch connected to a tractor's lift arm.

Referring to FIG. 5, illustrates a hitch disconnected from a implement. Retaining pin 2, is stored in retaining tab on the side of coupler 1, while not in use.

Figure 7:
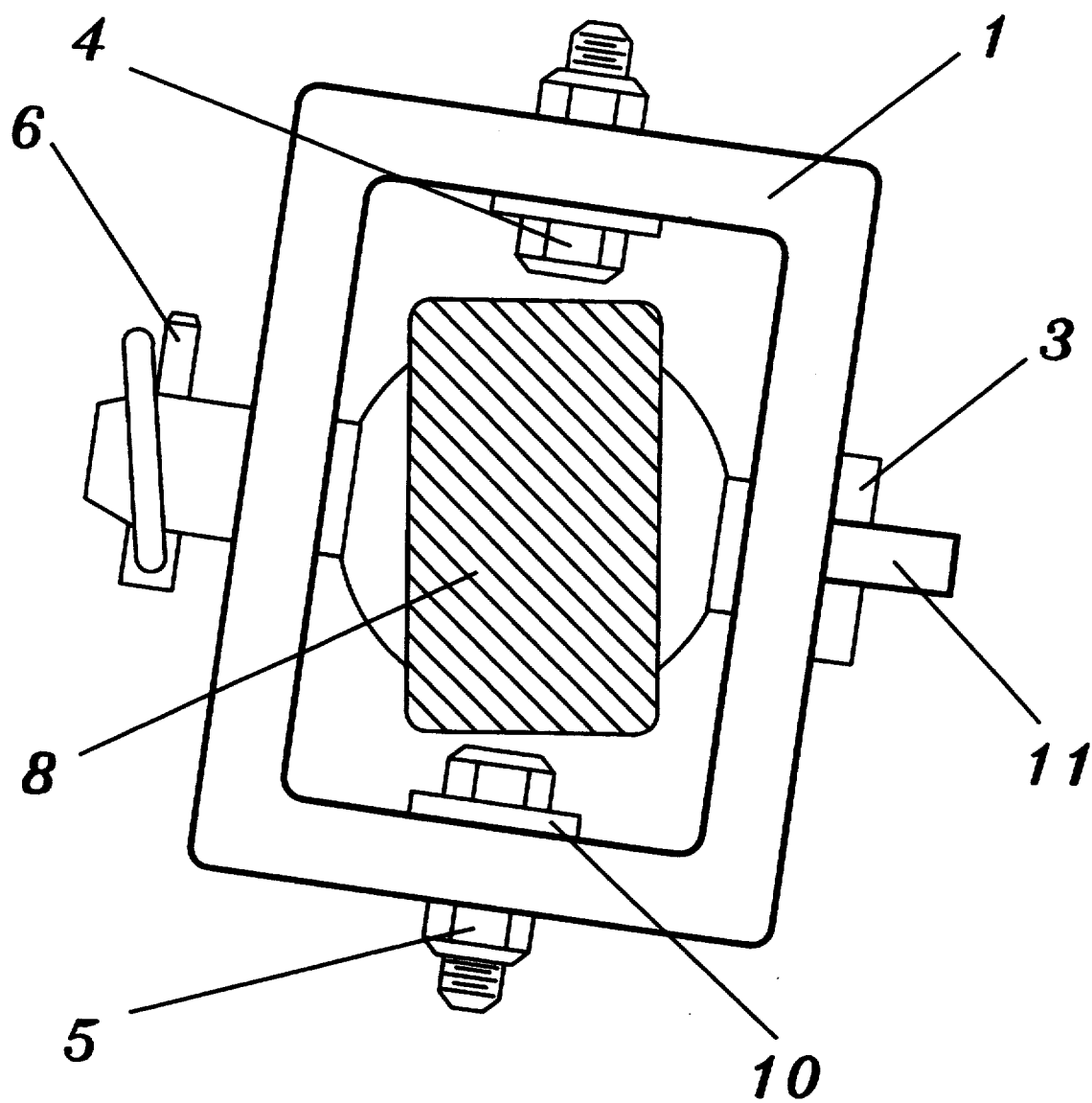
FIG. 7 illustrates how said hitch can rotate in any direction.

Referring to FIG. 7, illustrates how said coupler 1, can rotate up, down, and from side to side while connected to lift arms 8,. To adjust the amount of rotation add or remove washers 10, from bolts 4,.

Although the invention is described with respect to a preferred embodiment, modifications thereto will be apparent to those skilled in the art. Therefore, the scope of the invention is to be determined by reference to the claims which follow.

I claim:

1. A hitch for connecting an implement to a tractor comprising two couplers, wherein each coupler comprises:

a first end having a chamfered opening for receiving said implement;

a second end having a substantially rectangular opening for receiving a lift am of said tractor;

two aligned holes in said first end for receiving a retaining pin to connect said implement to said coupler;

two aligned holes in said second end for receiving a connecting pin to attach said coupler to said lift arm;

a lynch pin inserted into an end of said connecting pin to prevent said connecting pin from backing out of said coupler;

two holes in said second end for receiving a pair of retaining bolts which adjust to allow said coupler to accommodate different sizes of said lift arm, and to vary the amount of rotation of said coupler;

a tab attached to said coupler for storing the retaining pin while not in use; and a hairpin inserted into the retaining pin to prevent the retaining pin from dislodging from said coupler while in use.

2. The hitch as recited in claim 1, wherein said retaining pin is a hardened pin with a ring on one end and a hole in the other end for accepting said hairpin.

* * * * *